April 28, 1970
M. A DRANCHAK
3,509,443
PULSE CIRCUIT FOR SUPPLYING TWO CLOSELY
SPACED ELECTRIC PULSES
Filed Nov. 27, 1968
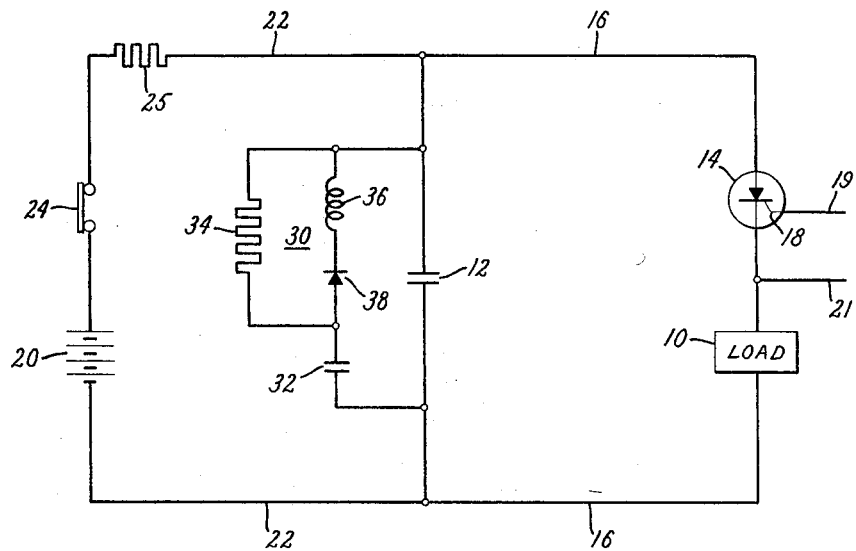
INVENTOR:
MATTHEW A. DRANCHAK,
BY William Freedman
ATTORNEY United States Patent Office 3,509,443
Patented Apr. 28, 1970

3,509,443
PULSE CIRCUIT FOR SUPPLYING TWO CLOSELY
SPACED ELECTRIC PULSES
Matthew A. Dranchak, Moorestown, N.J., assignor to
General Electric Company, a corporation of New York
Filed Nov. 27, 1968, Ser. No. 779,533
Int. Cl. H02j; H02m 3/06; H03k 3/00
U.S. Cl. 320—1                                    7 Claims

ABSTRACT OF THE DISCLOSURE

Discloses a pulse circuit for supplying two consecutive full-energy pulses within a very short time interval. Each pulse is derived from a main capacitor, which is charged between pulses by an auxiliary capacitor discharging into the main capacitor through a substantially undamped oscillatory circuit that is unidirectionally conducting.

This invention relates to a pulse circuit and, more particularly, to a pulse circuit capable of supplying two consecutive high-energy electrical pulses within a very short time interval.

For supplying an electrical pulse of relatively high energy to a load, it is common to use a capacitor as the supply source for the pulse and to connect the series combination of the load and a normally-off gating device across the capacitor. When the gating device is turned on, the capacitor discharges through the load, thus supplying the desired pulse.

For charging the capacitor, an energy source is connected thereacross through a resistor. To prevent the energy source from the supplying follow current to the load after the pulse, the resistor must be large enough to limit the current from the energy source sufficiently to allow turn-off of the gating device at the end of the pulse. The presence of this relatively large resistor in the capacitor-charging circuit limits the rate at which the capacitor can be recharged following the pulse and, hence, requires that a relatively long interval elapse before the capacitor can again be discharged to supply a full energy pulse to the load. In certain circuit applications, it may be necessary to supply a second pulse to the load before the capacitor can be recharged from the energy source through the resistor.

An object of my invention is to provide means for fully recharging such a capacitor in a much shorter time than is required to effect full recharging through the aforementioned resistor, thus allowing the second full-energy pulse to be supplied within a much shorter interval.

Another object is to provide for such faster recharging without increasing the size of the energy source used for charging the capacitor and with a minimum amount of modification of the above-described pulse circuit.

In carrying out my invention in one form, I provide a first capacitor across which the series combination of a gating device and a load is connected. Control means is provided for momentarily turning on the gating device to cause the first capacitor to discharge through the load, thus supplying a pulse to the load. An energy source is provided for charging the first capacitor through a resistor connected in series with the energy source. A second capacitor and a second resistor are connected in series with each other across the first capacitor to enable said source to also charge said second capacitor. Transfer means is provided for causing the energy stored in said second capacitor to be transferred to said first capacitor upon discharge of the first capacitor. This transfer means comprises the series combination of a unidirectional conducting device and an inductor connected across said second resistor and means for connecting this latter series combination in series with said first capacitor across said second capacitor during discharge of said second capacitor into first capacitor.

For a better understanding of the invention, reference may be had to the following description taken in conjunction with the accompanying drawing, wherein the single figure is a circuit diagram of a pulse circuit embodying one form of my invention.

Referring now to the figure, there is shown a load 10 to which it is desired to supply two consecutive electrical pulses separated by a short time interval. The second pulse should contain substantially as much energy as the first pulse. The supply source for these pulses is a capacitor 12, across which the series combination of load 10 and a normally-off gating device 14 is connected by means of a circuit 16.

The normally-off gating device 14 is illustrated as being a silicon controlled rectifier (SCR) of conventional design which can be turned on by supplying a suitable current signal to its gate lead 18 via a circuit extending through conductors 19 and 21. Assuming the capacitor 12 is charged, when the SCR is thus turned on, the capacitor quickly discharges via the circuit 16, thus supplying an electrical pulse of relatively high energy to the load 10. The turn-on current signal is supplied to the gate lead 18 of the SCR only during a portion of the pulse period, thereby permitting the SCR 14 to turn off at the end of the pulse.

For charging the capacitor 12, I provide an energy source in the form of a battery 20 which is adapted to be connected across capacitor 12 by means of a charging circuit 22 that comprises the series combination of a charge-initiating switch 24 and a resistor 25. Assuming that the switch 24 is closed, as shown, and the capacitor is discharged, the battery 20 will charge the capacitor 12 through resistor 25 in a time proportional to $R_1C_1$, where $R_1$ is the resistance of resistor 25 and $C_1$ is the capacitance of capacitor 12.

A reduction in the resistance of resistor 25 will allow battery 20 to charge capacitor 12 more quickly, but the extent to which this resistance can be reduced is limited by the need to turn off SCR 14 at the end of the above-described electrical pulse. In this connection, the resistance of resistor 25 must be high enough to limit the current through circuit 16 from battery 20 during the period following the pulse to a level below the holding current of SCR 14. With the follow current through circuit 16 so limited, the SCR 14 can turn off following the electric pulse. The SCR remains turned off until another turn-on signal is supplied to its gate lead 18.

The pulse circuit, as described up to this point, is primarily useful in supplying a single electrical pulse to a load. It can also be used for supplying multiple consecutive full energy pulses, but only if there is a sufficiently long period of time available between the pulses to allow the capacitor 12 to be fully recharged from the battery 20. Where only a short time is available between pulses (e.g., a millisecond), resistor 25 limits the capacitor charging rate to such an extent that the capacitor is insufficiently charged when the second pulse is needed. Because of the above-described need to turn off SCR 14 immediately after a pulse, the size of the resistor 25 cannot be decreased sufficiently to permit full recharging in the short period available between the pulses.

To enable a second full-energy pulse to be derived from capacitor 12 within a millisecond of the first pulse, I provide a fast-charge transfer circuit 30. This fast-charge transfer circuit 30 comprises an auxiliary capacitor 32 and an auxiliary resistor 34 connected in series with each other across the main capacitor 12 and also across the series combination of battery 20 and main resistor 25.

The fast-charge transfer circuit 30 further comprises the series combination of an inductance 36 and a unidirectional conducting device, in the form of blocking diode 38, connected across the auxiliary resistor 34. For reasons which will soon be pointed out, an auxiliary capacitor 32 is used which has a capacitance $C_2$ substantially the same as the capacitance $C_1$ of the main capaictor 12; and a resistor 34 is used which has a much higher resistance than that of resistor 25, e.g., ten times the resistance of resistor 25.

Initial charging of the capacitors 32 and 12 is effected by closing the switch 24, as shown, while the SCR 14 is in its normally-off condition. The main capacitor 12 is charged from battery 20 through resistor 25; while the auxiliary capacitor 32 is charged from the battery through the series combination of resistors 25 and 34. This charging time is on the order of tenths of seconds.

Assume now that capacitors 32 and 12 are fully charged and that the SCR 14 is then turned on. The main capacitor 12 rapidly discharges through circuit 16, as above described, to deliver a first pulse to load 10. The auxiliary capacitor 32 is prevented from significantly discharging during this brief pulse period by the relatively high resistance 34 and by the inductance 36. When the current supplied by capacitor 12 to load 10 drops to a value below the holding current of SCR 14, the SCR turns off and the electrical pulse is terminated. At this time, main capacitor 12 is substantially fully discharged, and auxiliary capacitor 32 is substantially fully charged.

Capacitor 32 responds to this condition by rapidly discharging through the circuit 38, 36, 12, which is then effectively connected across its terminals. This circuit comprising components 32, 38, 36, 12 is an oscillatory circuit whose period $t$ equals $$2\pi\sqrt{L\frac{C_1 C_2}{C_1+C_2}}$$

where L is the inductance of inductor 36, $C_1$ is the capacitance of main capacitor 12, and $C_2$ is the capacitance of auxiliary capacitor 32. Since both capacitors are of the same value ($C_1=C_2$) and since this is a substantially undamped oscillatory circuit, all of the charge on auxiliary capacitor 32 flows into main capacitor 12, charging it to full voltage in a short period of time (e.g., 1 millisecond). The blocking diode 38 prevents the energy from reversing and flowing back into capacitor 32 from capacitor 12. Thus, at the end of the first half-cycle period, the charge on auxiliary capacitor 32 has been transferred to the main capacitor 12, with the result being that the main capacitor 12 is charged to substantially full voltage and auxiliary capacitor 32 is substantially fully discharged. The charge on the capacitor 12 after this transfer is of the same polarity as before the first pulse.

SCR 14 can then be turned on again to obtain a second full-energy pulse from main capacitor 12. As with the first pulse, SCR 14 will turn off when capacitor 12 has substantially fully discharged, thus terminating the second pulse.

After capacitor 12 discharges the second time, both capacitors 32 and 12, which are then discharged, are recharged by the battery 20. Capacitor 12 is recharged through resistor 25 and the auuxiliary capacitor 32 through resistors 25 and 34, as previously described. This recharging operation requires tenths of seconds compared to the millisecond required to charge main capacitor 12 from the auxiliary capacitor 32, as above-described. No substantial withdrawal of energy from battery 20 occurs during the brief time the auxiliary capacitor 32 is charging the main capacitor.

Although auxiliary capacitor 32 can be made larger than the main capacitor 12, this is generally disadvantageous because it unnecessarily increases the charging duty imposed upon the battery 20 and unnecessarily increases the size of the auxiliary capacitor, all without resulting in any usefully higher voltage being developed on the main capacitor upon discharge of the auxiliary capacitor. In this latter regard, even with a large auxiliary capacitor, the battery 20 would act as a voltage regulator tending to limit the voltage appearing across main capacitor 12 during and following discharge of the auxiliary capacitor 32.

It will be apparent from the above description that the addition of a few components (32, 38, 36, 34) has rendered my basic single-pulse discharge circuit capable of delivering two consecutive full energy pulses with only a very short intervening time delay, much shorter than the time required to charge the main capacitor 12 from battery 20. The added components do not necessitate any increase in the size of the battery 20 since the time between pulses no longer needs to be dependent on the time required for the battery to recharge capacitor 12. Not only is the battery 20 of the basic single-pulse circuit retained unchanged, but all the other major components (24, 25, 12, and 14) of the basic circuit are retained without change. It will therefore be apparent that the above-described double-pulse capability has been introduced with a near-minimum of change in the basic single-pulse circuit.

While I have shown and described a particular embodiment of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. A circuit for supplying two closely spaced electrical pulses to a load comprising:
   (a) a normally-off gating device in series with said load,
   (b) a first capacitor across which the series combination of said gating device and said load is connected,
   (c) control means for momentarily turning on said gating device to cause said first capacitor to discharge through said load, thereby supplying a first electrical pulse to said load,
   (d) an energy source for charging said first capacitor and means comprising a resistor connected in series with said energy source for providing a charging circuit connecting said energy source across said first capacitor,
   (e) a second capacitor and a second resistor connected in series with each other across said first capacitor and also across the series combination of said energy source and said first resistor during the time said first capacitor is being charged from said energy source to provide for charging of said second capacitor from said source,
   (f) and transfer means for causing the energy stored in said second capacitor to be transferred to said first capacitor upon discharge of said first capacitor, comprising:
      (i) the series combination of a unidirectional conducting device and an inductor connected across said second resistor and
      (ii) means for connecting the series combination of said first capacitor, said unidirectional conducting device, and said inductor across said second capacitor during discharge of said second capacitor into said first capacitor,
   (g) said control means being adapted to run on said gating device after said second capacitor has discharged into said first capacitor to cause said first capacitor to again discharge and thus supply a second pulse to said load.

2. The circuit of claim 1 in which said transfer means comprises a substantially undamped oscillatory discharge circuit for said second capacitor comprising the series combination of said first capacitor, said unidirectional conducting device, and said inductor connected across said second capacitor.

3. The circuit of claim 1 in which:
   (a) the current through said gating device at the end of said first pulse must be below a predetermined holding value to allow turn-off of the gating device, and
   (b) said first resistor has a sufficiently high resistance to limit the current from said battery through said load at the end of said first pulse to value below said predetermined holding value.

4. The circuit of claim 1 in which said second resistor has a substantially higher resistance than said first resistor, whereby to prevent substantial discharge of said second capacitor through said second resistor during said first pulse.

5. The circuit of claim 1 in which said unidirectional conducting device allows current to flow from said second capacitor into said first capacitor in a direction to charge the first capacitor with the same polarity as present on said first capacitor immediately before said first pulse.

6. The circuit of claim 1 in which said first and second capacitors have substantially equal capacitances.

7. The circuit of claim 1 in which said second capacitor has a capacitance substantially equal to or greater than the capacitance of said first capacitor.

References Cited

UNITED STATES PATENTS

| | | | |
|---|---|---|---|
| 3,293,527 | 12/1966 | Julich | 320—1 |
| 3,403,295 | 9/1968 | Castelet | 320—1 X |

TERRELL W. FEARS, Primary Examiner

H. L. BERNSTEIN, Assistant Examiner

U.S. Cl. X.R.

307—108